United States Patent
Shimada

(10) Patent No.: US 10,026,552 B2
(45) Date of Patent: Jul. 17, 2018

(54) MULTILAYER CERAMIC CAPACITOR AND MANUFACTURING METHOD THEREFOR

(71) Applicant: Murata Manufacturing Co., Ltd., Nagaokakyo-shi, Kyoto-fu (JP)

(72) Inventor: Kohei Shimada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/372,905

(22) Filed: Dec. 8, 2016

(65) Prior Publication Data

US 2017/0178812 A1 Jun. 22, 2017

(30) Foreign Application Priority Data

Dec. 17, 2015 (JP) ................. 2015-246400

(51) Int. Cl.
| | |
|---|---|
| *C04B 35/468* | (2006.01) |
| *H01G 4/12* | (2006.01) |
| *C04B 35/64* | (2006.01) |
| *H01G 4/008* | (2006.01) |
| *H01G 4/248* | (2006.01) |

(Continued)

(52) U.S. Cl.
CPC ....... *H01G 4/1227* (2013.01); *C04B 35/4682* (2013.01); *C04B 35/64* (2013.01); *H01G 4/005* (2013.01); *H01G 4/008* (2013.01); *H01G 4/232* (2013.01); *H01G 4/248* (2013.01); *H01G 4/30* (2013.01); *H01G 4/308* (2013.01); *C04B 2235/3206* (2013.01); *C04B 2235/3208* (2013.01); *C04B 2235/3215* (2013.01); *C04B 2235/3224* (2013.01); *C04B 2235/3236* (2013.01); *C04B 2235/3244* (2013.01); *C04B 2235/3262* (2013.01); *C04B 2235/3293* (2013.01); *C04B 2235/3418* (2013.01); *C04B 2235/3436* (2013.01); *C04B 2235/6584* (2013.01); *C04B 2235/768* (2013.01); *C04B 2235/79* (2013.01); *C04B 2235/81* (2013.01)

(58) Field of Classification Search
CPC .............. C04B 35/468; C04B 35/4682; C04B 35/4686; C04B 35/465
See application file for complete search history.

(56) References Cited

U.S. PATENT DOCUMENTS 7,336,476 B2 2/2008 Kim et al.
8,445,397 B2 * 5/2013 Yamaguchi ......... C04B 35/4682
361/321.4

(Continued)

FOREIGN PATENT DOCUMENTS

JP 2007031273 A 2/2007

*Primary Examiner* — Noah S Wiese
(74) *Attorney, Agent, or Firm* — Arent Fox LLP

(57) ABSTRACT

A multilayer ceramic capacitor that includes a laminated body having a plurality of ceramic layers including crystal grains that have a perovskite structure, and a plurality of internal electrode layers; and external electrodes on first and second end surfaces of the laminated body and electrically connected to respective sets of the plurality of internal electrodes. In the ceramic layers, when the content of Ti is 100 parts by mol, the ceramic layers contain Ca at 0.10 to 15.00 parts by mol; Mg at 0.0010 to 0.0097 parts by mol; R at 0.50 to 4.00 parts by mol; M at 0.10 to 2.00 parts by mol; and Si at 0.50 to 2.00 parts by mol, and core parts of the crystal grains contain Ca.

17 Claims, 2 Drawing Sheets

(51) Int. Cl.
*H01G 4/30* (2006.01)
*H01G 4/005* (2006.01)
*H01G 4/232* (2006.01)

(56) References Cited

U.S. PATENT DOCUMENTS

| | | |
|---|---|---|
| 9,373,445 B2 * | 6/2016 | Okamoto ................. H01G 4/30 |
| 2007/0025060 A1 | 2/2007 | Kim et al. |
| 2008/0068778 A1 * | 3/2008 | Taniguchi .............. B82Y 30/00 |
| | | 361/321.4 |
| 2011/0222205 A1 * | 9/2011 | Muraki ................ C01G 23/006 |
| | | 361/321.5 |
| 2013/0141838 A1 * | 6/2013 | Fukuda ............... C04B 35/4682 |
| | | 361/321.4 |
| 2016/0155570 A1 | 6/2016 | Shimada et al. |

\* cited by examiner

MULTILAYER CERAMIC CAPACITOR AND MANUFACTURING METHOD THEREFOR

CROSS REFERENCE TO RELATED APPLICATIONS

The present application claims priority to Japanese Patent Application No. 2015-246400, filed Dec. 17, 2015, the entire contents of which are incorporated herein by reference.

BACKGROUND OF THE INVENTION

Field of the Invention

This invention relates to a multilayer ceramic capacitor, and a method for manufacturing the capacitor.

Description of the Related Art

In recent years, there is a growing demand for reduction in size and increase in capacitance for multilayer ceramic capacitors. In order to meet the demand, there is a need to reduce ceramic layers in thickness. As a multilayer ceramic capacitor that have ceramic layers reduced in thickness, there is a multilayer ceramic capacitor that uses a dielectric ceramic composition for low-temperature firing in Japanese Patent Application Laid-Open No. 2007-31273, for example.

The multilayer ceramic capacitor in Japanese Patent Application Laid-Open No. 2007-31273 includes a capacitor main body that has dielectric layers (also referred to as "ceramic layers") and internal electrode layers alternately laminated. The dielectric ceramic composition included in the dielectric layers contains, as its main constituent, $(Ba_{1-x}Ca_x)_mTiO_3$, $MgCO_3$, $RE_2O_3$ ($RE_2O_3$ represents one or more rare-earth oxides selected from the group consisting of $Y_2O_3$, $Dy_2O_3$, and $Ho_2O_3$), MO (M represents one element of Ba and Ca), MnO, $V_2O_5$, and $Cr_2O_3$ as accessory constituents, and $SiO_2$ as a sintering aid. The composition formula of the dielectric porcelain composition meets, when the composition formula is expressed as a $(Ba_{1-x}Ca_x)_mTiO_3$-$bMgCO_3$-$cRE_2O_3$-$dMO$-$eMnO$-$fSiO_2$-$gV_2O_5$-$hCr_2O_3$, a=100, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$ in molar ratio, and satisfies $0.005 \leq x \leq 0.15$ and $0.995 \leq m \leq 1.03$.

SUMMARY OF THE INVENTION

There is some concern that the multilayer ceramic capacitor as in Japanese Patent Application Laid-Open No. 2007-31273 will be locally reduced in thickness, with a segregation phase of Ni—Mg produced in the ceramic layers. Thus, there has been a problem that the multilayer ceramic capacitor can undergo a decrease in high-temperature load life.

Therefore, a main object of this invention is to provide a multilayer ceramic capacitor which has an adequate high-temperature load life, while reducing ceramic layers in thickness.

Another object of this invention is to provide a method for manufacturing a multilayer ceramic capacitor which has an adequate high-temperature load life, while reducing ceramic layers in thickness.

A multilayer ceramic capacitor according to a first aspect of this invention is a multilayer ceramic capacitor comprising a laminated body having a plurality of ceramic layers including crystal grains that have a perovskite structure and a plurality of internal electrode layers; and a pair of external electrodes on the surface of the laminated body and that are electrically connected to respective sets of the internal electrode layers. The ceramic layers contain a perovskite-type compound including Ba, Ca, and Ti; Mg; R (R represents at least one of rare-earth elements La, Ce, Pr, Nd, Sm, Eu, Gd, Tb, Dy, Ho, Er, Tm, Yb, Lu, and Y); M (M represents at least one of Zr, Mn, Co, Fe, Cr, Cu, Al, V, Mo, and W); and Si, and when the Ti content is 100 parts by mol, the ceramic layers contain Ca at 0.10 to 15.00 parts by mol; Mg at 0.0010 to 0.0097 parts by mol; R at 0.50 to 4.00 parts by mol; M at 0.10 to 2.00 parts by mol; and Si at 0.50 to 2.00 parts by mol, and the crystal grains have core parts containing Ca.

A multilayer ceramic capacitor according to a second aspect of this invention is a multilayer ceramic capacitor comprising a laminated body having a plurality of ceramic layers including crystal grains that have a perovskite structure and a plurality of internal electrode layers; and a pair of external electrodes on the surface of the laminated body and that are electrically connected to respective sets of the internal electrode layers. The laminated body contains a perovskite-type compound including Ba, Ca, and Ti; Mg; R (R represents at least one of rare-earth elements La, Ce, Pr, Nd, Sm, Eu, Gd, Tb, Dy, Ho, Er, Tm, Yb, Lu, and Y); M (M represents at least one of Zr, Mn, Co, Fe, Cr, Cu, Al, V, Mo, and W); and Si, and when the Ti content is 100 parts by mol, the laminated body contains Ca at 0.10 to 15.00 parts by mol; Mg at 0.0010 to 0.0097 parts by mol; R at 0.50 to 4.00 parts by mol; M at 0.10 to 2.00 parts by mol; and Si at 0.50 to 2.00 parts by mol, and the crystal grains have core parts containing Ca.

A multilayer ceramic capacitor according to a third aspect of this invention is a multilayer ceramic capacitor comprising a laminated body having a plurality of ceramic layers including crystal grains that have a perovskite structure and a plurality of internal electrode layers; and a pair of external electrodes on the surface of the laminated body and that are electrically connected to respective sets of the internal electrode layers. The laminated body contains a perovskite-type compound including Ba, Ca, and Ti; Mg; R (R represents at least one of rare-earth elements La, Ce, Pr, Nd, Sm, Eu, Gd, Tb, Dy, Ho, Er, Tm, Yb, Lu, and Y); M (M represents at least one of Zr, Mn, Co, Fe, Cr, Cu, Al, V, Mo, and W); and Si, and when a Ti content is 100 parts by mol when the laminated body is dissolved with a solvent, the laminated body contains Ca at 0.10 to 15.00 parts by mol; Mg at 0.0010 to 0.0097 parts by mol; R at 0.50 to 4.00 parts by mol; M at 0.10 to 2.00 parts by mol; and Si at 0.50 to 2.00 parts by mol, and the crystal grains have core parts containing Ca.

Preferably, R is R1, where R1 represents at least one of rare-earth elements Y, Dy, Gd, La, Ho, Er, Sm, and Yb.

More preferably, R includes R1 and R2, where R1 represents at least one of rare-earth elements Y, Dy, Gd, La, Ho, Er, Sm, and Yb, R2 represents at least one of rare-earth elements Ce, Pr, Nd, Eu, Tm, Lu, and Tb, and the R1/R2 in parts by mol has a value of 4.0 or more.

A method for manufacturing a multilayer ceramic capacitor according to this invention includes mixing a powder containing, as its main constituent, a perovskite-type compound comprising Ba, Ca, and Ti, a Mg compound, a compound of R (R represents at least one of rare-earth elements La, Ce, Pr, Nd, Sm, Eu, Gd, Tb, Dy, Ho, Er, Tm, Yb, Lu, and Y), a M compound (M represents at least one of Zr, Mn, Co, Fe, Cr, Cu, Al, V, Mo, and W), and an Si compound to obtain a ceramic slurry; forming the ceramic slurry into ceramic green sheets; laminating the ceramic green sheets with internal electrode patterns to obtain a raw laminated body; and firing the raw laminated body to obtain a laminated body, wherein, when the Ti content in the ceramic slurry is 100 parts by mol, the ceramic slurry contains Ca at 0.10 to 15.00 parts by mol; Mg at 0.0010 to 0.0097 parts by mol; R at 0.50 to 4.00 parts by mol; M at 0.10 to 2.00 parts by mol; and Si at 0.50 to 2.00 parts by mol.

Preferably, the method further includes mixing a Ca compound with the powder containing the perovskite-type compound.

In the multilayer ceramic capacitor according to this invention, the Mg content in the ceramic layers is extremely low as compared with the related art. Thus, a segregation phase of Ni—Mg can be kept from being produced. In addition, adverse effects such as abnormal grain growth, which can be caused by reducing the Mg content, are suppressed by the elements which the ceramic layers contain, other than Mg. As a result, the multilayer ceramic capacitor according to this invention has an adequate high-temperature load life.

According to this invention, a multilayer ceramic capacitor which has an adequate high-temperature load life can be provided while reducing ceramic layers in thickness.

In addition, according to this invention, a multilayer ceramic capacitor which has an adequate high-temperature load life can be manufactured, while reducing ceramic layers in thickness.

The foregoing object, other objects, features, and advantages of the invention will be further evident from the following description taken with reference to the drawings.

DETAILED DESCRIPTION OF EMBODIMENTS OF THE INVENTION

Multilayer Ceramic Capacitor

Figure 1:
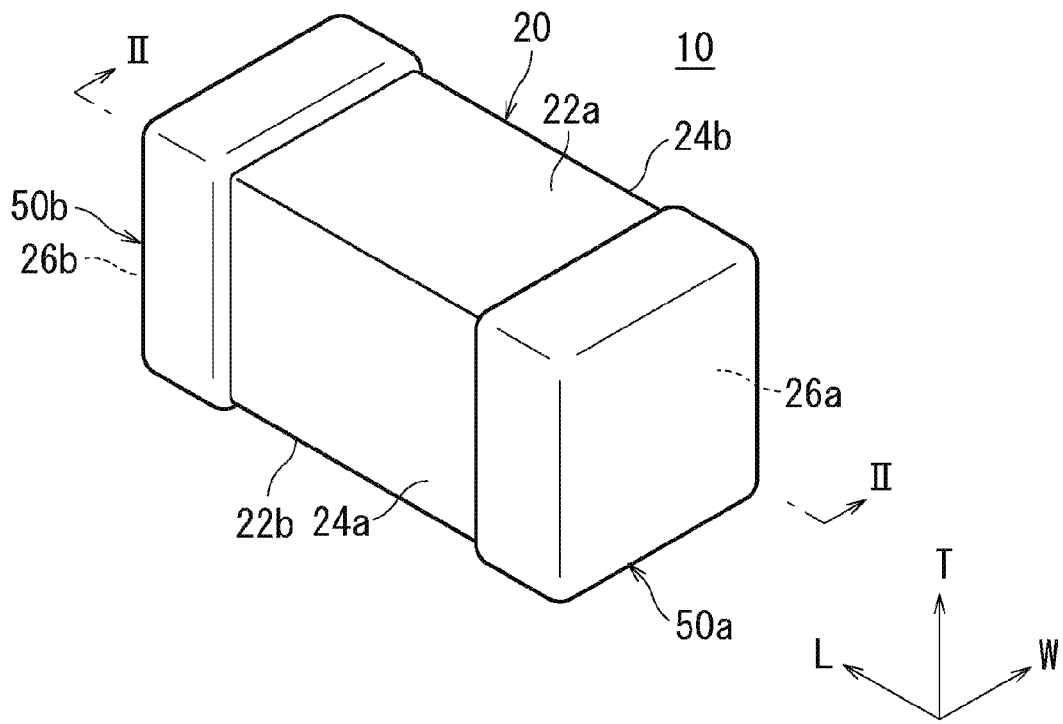
FIG. 1 is an appearance perspective view illustrating a multilayer ceramic capacitor according to an embodiment of the invention.
Figure 2:
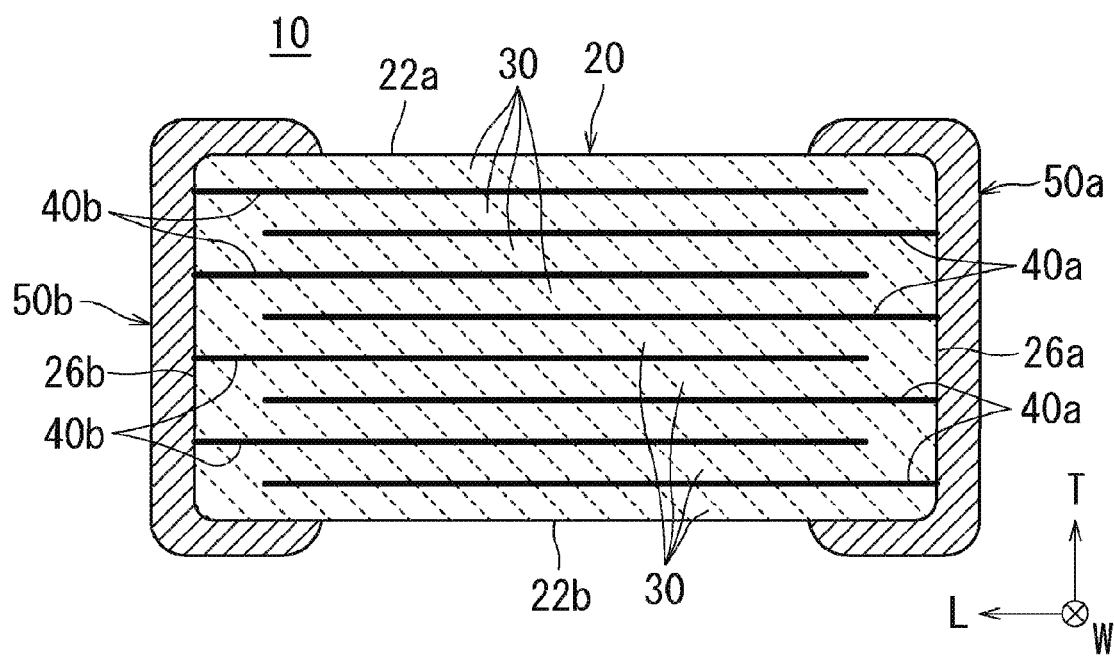
FIG. 2 is a cross-sectional view along the line II-II of FIG. 1, which illustrates the multilayer ceramic capacitor according to the embodiment of the invention.

A multilayer ceramic capacitor according to an embodiment of the invention will be described below with reference to the drawings. FIG. 1 is an appearance perspective view illustrating a multilayer ceramic capacitor according to an embodiment of the invention. FIG. 2 is a cross-sectional view along the line II-II of FIG. 1, which illustrates the multilayer ceramic capacitor according to the embodiment of the invention.

A multilayer ceramic capacitor 10 according to the embodiment includes a laminated body 20, and a first external electrode 50a and a second external electrode 50b (a pair of external electrodes) formed on the surface of the laminated body 20.

(Laminated Body 20)

The laminated body 20 is formed in a rectangular parallelepiped shape by laminating a plurality of ceramic layers 30, a plurality of first internal electrodes 40a, and a plurality of second internal electrodes 40b. The laminated body 20 includes a first principal surface 22a and a second principal surface 22b opposed in the laminating direction (T direction), a first side surface 24a and a second side surface 24b opposed in the width direction (W direction) perpendicular to the T direction, and a first end surface 26a and a second end surface 26b opposed in the length direction (L direction) perpendicular to the T direction and the W direction. The laminated body 20 preferably has corners and ridges rounded. In addition, the rectangular parallelepiped shape of the laminated body 20 is not particularly limited, as long as the shape includes the first and second principal surfaces 22a, 22b, the first and second side surfaces 24a, 24b, and the first and second end surfaces 26a, 26b.

(First and Second Internal Electrode Layers 40a, 40b)

The first internal electrode layers 40a extend in the shape of a plate at the interfaces between the ceramic layers 30, and have ends exposed at the first end surface 26a of the laminated body 20. On the other hand, the second internal electrode layers 40b extend in the shape of a plate at the interfaces between the ceramic layers 30 to be opposed to the first internal electrode layers 40a with the ceramic layers 30 interposed therebetween, and have ends exposed at the second end surface 26b of the laminated body 20. Therefore, the first and second internal electrode layers 40a, 40b have opposed parts opposed to each other with the ceramic layers 30 interposed therebetween, and extended parts extended to the first and second end surfaces 26a, 26b. The first and the second internal electrodes 40a, 40b are opposed to each other with the ceramic layers 30 interposed therebetween, thereby generating electrostatic capacitance.

(First and Second External Electrodes 50a, 50b)

The first external electrode 50a is formed on the first end surface 26a of the laminated body 20, and formed therefrom to reach respective portions of the first and second principal surfaces 22a, 22b and respective portions of the first and second side surfaces 24a, 24b. It is to be noted that the first external electrode 50a may be formed only on the first end surface 26a of the laminated body 20. The first external electrode 50a is electrically connected to the first internal electrode layers 40a at the first end surface 26a of the laminated body 20. On the other hand, the second external electrode 50b is formed on the second end surface 26b of the laminated body 20, and formed therefrom to reach respective portions of the first and second principal surfaces 22a, 22b and respective portions of the first and second side surfaces 24a, 24b. It is to be noted that the second external electrode 50b may be formed only on the second end surface 26b of the laminated body 20. The second external electrode 50b is electrically connected to the second internal electrode layers 40b at the second end surface 26b of the laminated body 20.

(Ceramic Layer 30)

The ceramic layers 30 are sandwiched between the first internal electrode layers 40a and the second internal electrode layers 40b, and laminated in the T direction.

The ceramic layers 30 (or the laminated body 20) contain a perovskite-type compound including Ba, Ca, and Ti; Mg; R (R represents at least one of rare-earth elements La, Ce, Pr, Nd, Sm, Eu, Gd, Tb, Dy, Ho, Er, Tm, Yb, Lu, and Y); M (M represents at least one of Zr, Mn, Co, Fe, Cr, Cu, Al, V, Mo, and W); and Si. The contents (parts by mol) of the respective elements mentioned above in the ceramic layers 30 (or the laminated body 20) are as follows.

The contents of the respective elements are as follows when the content of Ti is regarded as 100 parts by mol. Ca is 0.10 parts by mol or more and 15.00 parts by mol or less. Further, Ca is preferably 0.40 parts by mol or more and 10.00 parts by mol or less, and more preferably 0.75 parts by mol or more and 7.50 parts by mol or less. Mg is 0.0010 parts by mol or more and 0.0097 parts by mol or less.

Further, Mg is preferably 0.0010 parts by mol or more and 0.0090 parts by mol or less, and more preferably 0.0010 parts by mol or more and 0.0075 parts by mol or less. R is 0.50 parts by mol or more and 4.00 parts by mol or less. Further, R is preferably 0.50 parts by mol or more and 3.00 parts by mol or less, and more preferably 0.50 parts by mol or more and 2.50 parts by mol or less. M is 0.10 parts by mol or more and 2.00 parts by mol or less. Further, M is preferably 0.10 parts by mol or more and 1.50 parts by mol or less, and more preferably 0.10 parts by mol or more and 1.00 parts by mol or less. Si is 0.50 parts by mol or more and 2.00 parts by mol or less. Further, Si is preferably 0.60 parts by mol or more and 1.90 parts by mol or less, and more preferably 0.80 parts by mol or more and 1.60 parts by mol or less.

It is to be noted that the above-mentioned contents (parts by mol) of the respective elements have numerical values obtained by weighing in the preparation of a ceramic raw material (dielectric raw material formulation) for the formation of the ceramic layers 30, or numerical values obtained by an ICP analysis of a solution obtained by dissolving the laminated body 20 with a solvent.

In addition, Ca is included in core parts of crystal grains in the ceramic layers 30 (or the laminated body 20).

The R mentioned above is preferably R1, where R1 represents at least one of rare-earth elements Y, Dy, Gd, La, Ho, Er, Sm, and Yb.

Alternatively, preferably, the R mentioned above includes R1 and R2, where R1 represents at least one of rare-earth elements Y, Dy, Gd, La, Ho, Er, Sm, and Yb, R2 represents at least one of rare-earth elements Ce, Pr, Nd, Eu, Tm, Lu, and Tb, and the ratio of R1/R2 in parts by mol has a value of 4.0 or more.

(Advantageous Effect)

In the multilayer ceramic capacitor 10 according to this embodiment, the Mg content in the ceramic layers 30 (or the laminated body 20) is, when Ti is regarded as 100 parts by mol, 0.0010 parts by mol or more and 0.0097 parts by mol or less, and extremely lower as compared with the related art. Thus, a segregation phase of Ni—Mg can be kept from being produced. In addition, adverse effects such as abnormal grain growth, which can be caused by reducing the Mg content, are suppressed by the elements (Ca, R, M, and Si) which the ceramic layers 30 (or the laminated body 20) contain(s), other than Mg. As a result, the multilayer ceramic capacitor 10 according to this embodiment has an adequate high-temperature load life.

In addition, R is R1 (R1 represents at least one of rare-earth elements Y, Dy, Gd, La, Ho, Er, Sm, and Yb) (more specifically, only R1 is used as R), thereby further improving the high-temperature load life, and improving the reliability of the multilayer ceramic capacitor 10. This is because, among the rare-earth elements designated as R, R1 has a great effect of inhibiting the movement of oxygen vacancies.

In addition, R has the above-mentioned rare-earth elements designated as R1 and R2 (as R, R1 and R2 are used in combination), where R1/R2 in parts by mol has a value of 4.0 or more, thereby further improving the high-temperature load life, and improving the reliability of the multilayer ceramic capacitor 10.

This is because R1 has a greater effect of inhibiting the movement of oxygen vacancies, as compared with R2.

Method for Manufacturing Multilayer Ceramic Capacitor

A method for manufacturing a multilayer ceramic capacitor according to this invention will be described by taking, as an example, the multilayer ceramic capacitor 10 according to the embodiment described above. First, a process for preparing a ceramic raw material (dielectric raw material formulation) will be described, and thereafter, a process for preparing a multilayer ceramic capacitor will be described.

(Preparation of Ceramic Raw Material)

First, powders of $BaCO_3$, $CaCO_3$, and $TiO_2$ are prepared as starting raw materials, and weighed in predetermined amounts so as to achieve (Ba+Ca): Ti=1:1 in content (parts by mol).

Next, the starting raw materials weighed as mentioned above are mixed with a ball mill.

Then, the materials are subjected to heat treatment at 1150° C., thereby providing $BaTiO_3$ (barium titanate) that is a perovskite-type compound including Ba and Ti, and $(Ba,Ca)TiO_3$ (barium calcium titanate) that is a perovskite-type compound including Ba, Ca, and Ti. It is to be noted that barium calcium titanate as a main constituent may be prepared by a solid-phase synthesis method, or prepared by a hydrothermal synthesis method or a hydrolysis method.

The $BaTiO_3$ and $(Ba,Ca)TiO_3$ obtained in the way mentioned above are, with a ball mill, mixed with appropriately weighed MgO, $R_2O_3$, an oxide of M, and $SiO_2$ (a Mg compound, a compound of R, a compound of M, an Si compound), optionally as well as $CaCO_3$ as additive constituents. In this regard, R represents at least one of rare-earth elements La, Ce, Pr, Nd, Sm, Eu, Gd, Tb, Dy, Ho, Er, Tm, Yb, Lu, and Y. In addition, M represents at least one of Zr, Mn, Co, Fe, Cr, Cu, Al, V, Mo, and W. In this regard, the compounds are weighed and mixed such that Ca, Mg, R, M, and Si are included respectively at 0.10 parts by mol or more and 15.00 parts by mol or less, 0.0010 parts by mol or more and 0.0097 parts by mol or less, 0.50 parts by mol or more and 4.00 parts by mol or less, 0.10 parts by mol or more and 2.00 parts by mol or less, and 0.50 parts by mol or more and 2.00 parts by mol or less, when the Ti content is regarded as 100 parts by mol. Then, the compounds are dried thereby providing a ceramic raw material.

It is to be noted that the additive constituents may be, but not limited to, oxides and carbonates as mentioned above, or may be chlorides and organic metal compounds. In addition, as mentioned above, the mixing of $CaCO_3$ (subsequently added Ca) is optional which is performed at the timing of adding other additives after the preparation of the barium calcium titanate. More specifically, the mixing of $CaCO_3$ may be performed in a way that Ca is included in the starting raw materials for the preparation of the barium calcium titanate (that is, only preliminarily added Ca), without any subsequently added Ca. The preliminarily added Ca can make Ca included in core parts of crystal grains in completed ceramic layers (or laminated body). It is to be noted that in the case of subsequently added Ca also in addition to the preliminarily added Ca, the compounds are weighed and mixed such that the total amount of the preliminarily added Ca and subsequently added Ca accounts for the above-mentioned content of Ca: 0.10 parts by mol or more and 15.00 parts by mol or less. In addition, the ratio A/B in content (parts by mol) between an A site and a B site of $(Ba,Ca)TiO_3$ as a main constituent preferably falls within the range of 0.980 or more and 1.020 or less. However, the ratio A/B in content (parts by mol) has only to fall within the range of producing the advantageous effect of the invention, but does not have to meet the stoichiometric composition.

(Preparation of Multilayer Ceramic Capacitor)

The ceramic raw material obtained in the way mentioned above is, with the addition of a polyvinyl butyral-based binder, a plasticizer, and ethanol as an organic solvent thereto, subjected to wet mixing with a ball mill, thereby providing ceramic slurry.

Next, the ceramic slurry obtained in the way mentioned above is subjected to sheet forming in a lip manner, thereby providing rectangular (4.5 μm in thickness) ceramic green sheets.

Then, a conductive paste is applied by screen printing to surfaces of the ceramic green sheets obtained in the way mentioned above, thereby forming conductive paste films (internal electrode patterns) containing Ni as their main constituents to serve as internal electrodes. It is to be noted that the main constituent of the conductive paste films is not limited to Ni, but may be a Ni alloy.

Furthermore, the ceramic green sheets with the conductive paste films formed are stacked to be sandwiched between the ceramic green sheets with no conductive paste film formed. In this regard, the sheets are stacked such that extended ends of conductive paste films are alternated. The laminated body block is formed in this way, and the laminated body block is cut to obtain a raw laminated body.

Subsequently, the raw laminated body obtained in the way mentioned above is heated for 3 hours at 350° C. in a $N_2$ atmosphere, thereby burning the binder, and then subjected to firing for 2 hours at 1200° C. in a reducing atmosphere of a $H_2$—$N_2$—$H_2O$ gas with an oxygen partial pressure of $10^{-9}$ MPa or higher and $10^{-12}$ MPa or less, thereby providing a sintered laminated body (a laminated body with Ni-containing internal electrode layers formed).

Finally, a Cu paste containing glass frit is applied to both end surfaces of the laminated body obtained in the way mentioned above, and baked at a temperature of 800° C. in a $N_2$ atmosphere, and the surfaces are subjected to Ni plating and Sn plating, thereby forming external electrodes electrically connected to the internal electrode layers, and thus providing a multilayer ceramic capacitor.

Experimental Example

Experimental Examples 1 and 2 will be described below which was provided by the inventors for confirming the advantageous effects of this invention. In Experimental Examples 1 and 2, samples according to Examples 1 to 27 and Comparative Examples 1 to 13 were prepared in accordance with the method for manufacturing a multilayer ceramic capacitor as mentioned above, and each evaluated for high-temperature load life.

Examples and Comparative Examples

The specifications according to Examples 1 to 27 and Comparative Examples 1 to 13 are as follows. It is to be noted that the respective numerical values are all actual measurement values.

T-directional Dimension: 1.25 mm (including a pair of external electrodes)
W-directional Dimension: 1.25 mm (ditto)
L-directional Dimension: 2.0 mm (ditto)
Thickness per Ceramic Layer: on average 3.0 μm
Thickness per Internal Electrode Layer: on average 0.6 μm
The Number of Effective Ceramic Layers Laminated: 300 layers
Area of Part Opposed per Effective Ceramic Layer: on average 1.6 $mm^2$ (Method for Measuring Thickness of Ceramic Layer)

Figure 3:
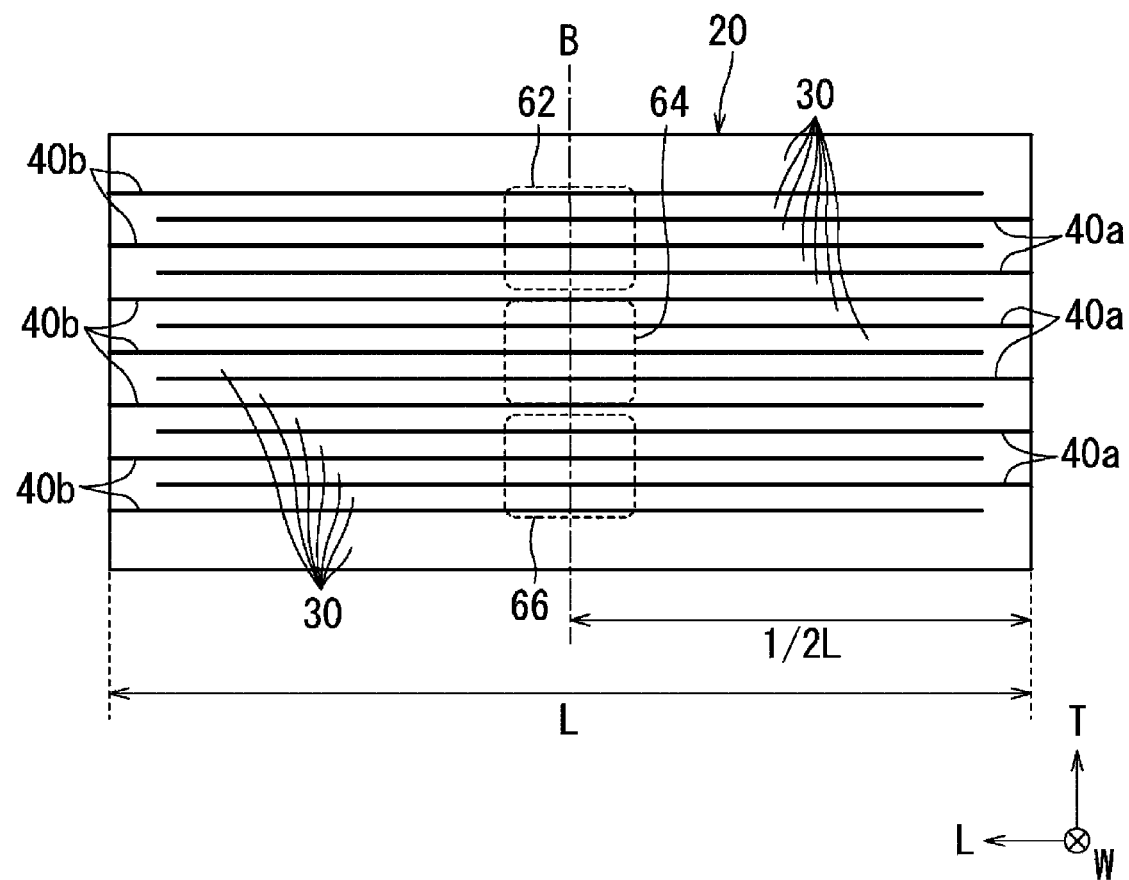
FIG. 3 is a schematic diagram for explaining a method for measuring the thickness of ceramic layers included in a multilayer ceramic capacitor according to the embodiment of the invention.

It is to be noted that the thickness per ceramic layer was measured as follows. FIG. 3 is a schematic diagram for explaining a method for measuring the thickness of ceramic layers included in a multilayer ceramic capacitor according to an embodiment of the invention. It is to be noted that the first and second external electrodes 50a, 50b are omitted in FIG. 3. First, five multilayer ceramic capacitors were prepared for each of Examples 1 to 27 and Comparative Examples 1 to 13 (multilayer ceramic capacitor 10). Next, the L-directional and T-directional surface (hereinafter, referred to as an "LT surface") of the multilayer ceramic capacitor 10 was polished with the use of a polishing machine until the W-directional dimension came down to about ½ thereof. Furthermore, the polished LT surface was processed by ion milling, in order to eliminate shear drop of the first and second internal electrode layers 40a, 40b. Then, a reference line B extending substantially perpendicular to the first and second internal electrode layers 40a, 40b at a position of about ½ in the L direction (that is, a center line indicated by a dashed-dotted line in FIG. 3, which extends in the T direction substantially in the L-directional center) was defined at the polished LT surface. Next, on the reference line B and in the vicinity thereof, the region of the first and second internal electrode layers 40a, 40b laminated was divided in the T direction into three equal parts regarded as an upper region 62, an intermediate region 64, and a lower region 66. Furthermore, in each of the upper region 62, the intermediate region 64, and the lower region 66, five layers were selected randomly from the ceramic layers 30, and for each of the five layers, the thickness on the reference line B was measured with a scanning electron microscope (SEM). More specifically, the total of measurement points is: five multilayer ceramic capacitors×three regions×five ceramic layers=75 points. Finally, the average of the measurement values at the 75 points was taken, and regarded as a thickness per ceramic layer. It is to be noted that the thickness per internal electrode layer was also measured by the similar method.

The compositions prepared according to Examples 1 to 16 and Comparative Examples 1 to 13 are each as shown in Table 1 (the table for Experimental Example 1). These samples each contain one type of rare-earth element R. The compositions prepared according to Examples 17 to 27 are each as shown in Table 2 (the table for Experimental Example 2). These samples each contain two types of rare-earth elements R1 and R2.

It is to be noted that the contents (parts by mol) of the respective elements as shown in Tables 1 and 2 have numerical values obtained when the content of Ti is regarded as 100 parts by mol.

Further, as also explained with the method for manufacturing a multilayer ceramic capacitor, R represents at least one of rare-earth elements La, Ce, Pr, Nd, Sm, Eu, Gd, Tb, Dy, Ho, Er, Tm, Yb, Lu, and Y. In addition, R1 represents at least one of Y, Dy, Gd, La, Ho, Er, Sm, and Yb. In addition, R2 represents at least one of Ce, Pr, Nd, Eu, Tm, Lu, and Tb. In addition, M represents at least one of Zr, Mn, Co, Fe, Cr, Cu, Al, V, Mo, and W.

In addition, the total contents of Ca (parts by mol) according to Examples 1 to 27 and Comparative Examples 1 to 13 as shown in Tables 1 and 2 refer to values obtained by adding the content (parts by mol) of the preliminarily added Ca (that is, Ca included in $CaCO_3$ as a starting raw material) and the content (parts by mol) of the subsequently added Ca (that is, Ca included in $CaCO_3$ as an additive constituent). More specifically, the content of the preliminarily added Ca refers to a value obtained by subtracting the content of the subsequently added Ca from the total content of Ca as shown in Tables 1 and 2. In this regard, for Examples 1 to 14 and 17 to 27 and Comparative Examples 1 to 11 (that is, all of the samples excluding Examples 15 and 16 and Comparative Examples 12 and 13), the content of the subsequently added Ca is 0.00 parts by mol. More specifically, the samples were prepared by $CaCO_3$ mixing only with the preliminarily added Ca. On the other hand, for Examples 15 and 16, the contents of the subsequently added Ca are respectively 5.00 parts by mol and 0.05 parts by mol. More specifically, the samples were prepared by $CaCO_3$ mixing also with the subsequently added Ca in addition to the preliminarily added Ca. In addition, for each of Comparative Examples 12 and 13, the total content of Ca is equal to the content of the subsequently added Ca. More specifically, Comparative Examples 12 and 13 were prepared by $CaCO_3$ mixing only with the subsequently added Ca, without the preliminarily added Ca. Comparative Examples 12 and 13 contain, because of the preparation as just described, no Ca in core parts of crystal grains.

Further, in the preparation of the respective samples (Examples 1 to 27 and Comparative Examples 1 to 13), the barium titanate and barium calcium titanate obtained by mixing starting raw materials and applying heat treatment to the materials were 0.15 μm in average particle size. In addition, the barium titanate and barium calcium titanate as main constituents for the respective samples were prepared by a solid-phase synthesis method from the starting raw materials mentioned above. In addition, in the preparation of the laminated body for each sample, the oxygen partial pressure in the reducing atmosphere of the $H_2$—$N_2$—$H_2O$ gas in firing the raw laminated body was adjusted to $10^{-10}$ MPa. In addition, the structural analysis of the laminated body for each sample by XRD (X-ray diffraction) demonstrated that the main constituent had a barium titanate-based perovskite-type structure.

In addition, the external electrodes of the respective samples (Examples 1 to 27 and Comparative Examples 1 to 13) were removed by polishing, the laminated bodies obtained were subjected to dissolution treatment to provide solutions, and the solutions were subjected to an ICP analysis, thereby successfully confirming that the solutions were almost identical to the prepared compositions shown in Tables 1 and 2, except for Ni as a constituent of the internal electrode layers. More specifically, the contents (parts by mol) of the respective elements as shown in Tables 1 and 2 can be considered as contents in a solution obtained by dissolving the laminated body with a solvent.

Further, ceramic layers according to Examples 1 to 27 and Comparative Examples 1 to 11 were randomly reduced in thickness at 10 points, and core parts (central parts) (measurement points: 10 points) of crystal grains were observed with the use of STEM-EDS (transmission electron microscope-energy dispersive X-ray analysis), thereby detecting Ca from the core parts of the crystal grains at each of the measurement points. On the other hand, Ca was not detected from core parts of crystal grains in ceramic layers according to Comparative Examples 12 and 13. It is to be noted that for the STEM, "JEM-2200FS" from JEOL Ltd. was used, and the acceleration voltage was adjusted to 200 kV. For the detector EDS, "JED-2300T" from JEOL Ltd. was used, and an SDD detector of 60 mm$^2$ in caliber was used. For the EDS system, "Noran System 7" from Thermo Fisher Scientific Inc. was used.

It is to be noted that Comparative Examples 1 and 2 fail to fulfill the requirement of the invention that: the total content of Ca is 0.10 parts by mol or more and 15.00 parts by mol or less. In addition, Comparative Examples 3 to 5 fail to fulfill the requirement of the invention that: the Mg content is 0.0010 parts by mol or more and 0.0097 parts by mol or less. In addition, Comparative Examples 6 and 7 fail to fulfill the requirement of the invention that: the R content is 0.50 parts by mol or more and 4.00 parts by mol or less. In addition, Comparative Examples 8 and 9 fail to fulfill the requirement of the invention that: the M content is 0.10 parts by mol or more and 2.00 parts by mol or less. In addition, Comparative Examples 10 and 11 fail to fulfill the requirement of the invention that: the Si content is 0.50 parts by mol or more and 2.00 parts by mol or less. In addition, Comparative Examples 12 and 13 fail to fulfill the requirement of the invention that: Ca is included in the core parts of the crystal grains, because the preliminarily added Ca is 0.00 parts by mol.

(Evaluation Method)

One hundred samples were prepared for each of the samples (Examples 1 to 27 and Comparative Examples 1 to 13), and the change in insulation resistance with the passage of time was observed by applying a voltage of 16 V to each of the samples at a temperature of 125° C. The samples with the insulation resistance down to 0.1 MΩ or less were regarded as defectives.

In Experimental Example 1, for each of the samples (Examples 1 to 16 and Comparative Examples 1 to 13) containing one type (R) of rare-earth element, the number of defectives after 1000 hours from the start of the test was confirmed, and then regarded as an index for evaluating the high-temperature load life.

In Experimental Example 2, for each of the samples (Examples 17 to 27) containing two types (R1 and R2) of rare-earth elements, the numbers of defectives after 1000 hours and after 2000 hours from the start of the test were confirmed, and then regarded as indexes for evaluating the high-temperature load life.

(Evaluation Result)

Table 1 shows the evaluation results and prepared compositions for Experimental Example 1

TABLE 1

| | | Main Constituent | Total Content of Ca (parts by mol) | Content of Subsequently Added Ca (parts by mol) | Mg Content (parts by mol) | Type of R | R Content of R (parts by mol) | Type of M | M Content of M (parts by mol) | Content of Si (parts by mol) | The Number of Defects (after 1000 h) |
|---|---|---|---|---|---|---|---|---|---|---|---|
| Example | 1 | (Ba, Ca) TiO$_3$ | 3.06 | 0.00 | 0.0048 | Ce | 0.94 | Zr | 0.10 | 0.85 | 0 |
| | 2 | (Ba, Ca) TiO$_3$ | 6.19 | 0.00 | 0.0097 | Y | 0.83 | Cu | 0.27 | 1.70 | 0 |
| | 3 | (Ba, Ca) TiO$_3$ | 5.63 | 0.00 | 0.0045 | La | 0.80 | Mo | 0.81 | 0.79 | 0 |
| | 4 | (Ba, Ca) TiO$_3$ | 6.32 | 0.00 | 0.0011 | Eu | 3.81 | Zr | 0.75 | 0.50 | 0 |
| | 5 | (Ba, Ca) TiO$_3$ | 4.54 | 0.00 | 0.0082 | Tm | 4.00 | W | 0.78 | 1.35 | 0 |
| | 6 | (Ba, Ca) TiO$_3$ | 15.00 | 0.00 | 0.0022 | Lu | 1.24 | W | 1.07 | 0.66 | 0 |

TABLE 1-continued

|  |  | Main Constituent | Total Content of Ca (parts by mol) | Content of Subsequently Added Ca (parts by mol) | Mg Content (parts by mol) | Type of R | R Content of R (parts by mol) | Type of M | M Content of M (parts by mol) | Content of Si (parts by mol) | The Number of Defects (after 1000 h) |
|---|---|---|---|---|---|---|---|---|---|---|---|
|  | 7 | (Ba, Ca) TiO$_3$ | 3.63 | 0.00 | 0.0043 | Pr | 3.66 | Fe | 0.37 | 1.18 | 0 |
|  | 8 | (Ba, Ca) TiO$_3$ | 11.80 | 0.00 | 0.0047 | Tb | 1.06 | V | 1.30 | 0.74 | 0 |
|  | 9 | (Ba, Ca) TiO$_3$ | 0.10 | 0.00 | 0.0091 | Ho | 3.42 | Al | 0.93 | 1.23 | 0 |
|  | 10 | (Ba, Ca) TiO$_3$ | 3.54 | 0.00 | 0.0078 | Yb | 0.50 | Mn | 0.86 | 1.93 | 0 |
|  | 11 | (Ba, Ca) TiO$_3$ | 3.60 | 0.00 | 0.0065 | Er | 0.63 | Al | 2.00 | 1.23 | 0 |
|  | 12 | (Ba, Ca) TiO$_3$ | 4.35 | 0.00 | 0.0011 | Nd | 0.63 | Cr | 1.14 | 1.49 | 0 |
|  | 13 | (Ba, Ca) TiO$_3$ | 14.04 | 0.00 | 0.0059 | Gd | 3.63 | Co | 0.12 | 2.00 | 0 |
|  | 14 | (Ba, Ca) TiO$_3$ | 11.75 | 0.00 | 0.0010 | Sm | 3.80 | V | 0.99 | 0.54 | 0 |
|  | 15 | (Ba, Ca) TiO$_3$ | 15.00 | 5.00 | 0.0051 | Sm | 3.80 | V | 0.99 | 0.54 | 0 |
|  | 16 | (Ba, Ca) TiO$_3$ | 0.10 | 0.05 | 0.0051 | Sm | 3.80 | V | 0.99 | 0.54 | 0 |
| Comparative Example | 1 | (Ba, Ca) TiO$_3$ | 0.08 | 0.00 | 0.0050 | Dy | 2.00 | Mn | 1.75 | 1.75 | 7 |
|  | 2 | (Ba, Ca) TiO$_3$ | 15.02 | 0.00 | 0.0050 | Dy | 2.00 | Mn | 1.75 | 1.75 | 18 |
|  | 3 | (Ba, Ca) TiO$_3$ | 5.00 | 0.00 | 0.0000 | Dy | 2.00 | Mn | 1.75 | 1.75 | 22 |
|  | 4 | (Ba, Ca) TiO$_3$ | 5.00 | 0.00 | 0.0008 | Dy | 2.00 | Mn | 1.75 | 1.75 | 19 |
|  | 5 | (Ba, Ca) TiO$_3$ | 5.00 | 0.00 | 0.0100 | Dy | 2.00 | Mn | 1.75 | 1.75 | 5 |
|  | 6 | (Ba, Ca) TiO$_3$ | 5.00 | 0.00 | 0.0050 | Dy | 0.47 | Mn | 1.75 | 1.75 | 35 |
|  | 7 | (Ba, Ca) TiO$_3$ | 5.00 | 0.00 | 0.0050 | Dy | 4.02 | Mn | 1.75 | 1.75 | 36 |
|  | 8 | (Ba, Ca) TiO$_3$ | 5.00 | 0.00 | 0.0050 | Dy | 2.00 | Mn | 0.08 | 1.75 | 31 |
|  | 9 | (Ba, Ca) TiO$_3$ | 5.00 | 0.00 | 0.0050 | Dy | 2.00 | Mn | 2.03 | 1.75 | 5 |
|  | 10 | (Ba, Ca) TiO$_3$ | 5.00 | 0.00 | 0.0050 | Dy | 2.00 | Mn | 1.75 | 0.47 | 32 |
|  | 11 | (Ba, Ca) TiO$_3$ | 5.00 | 0.00 | 0.0050 | Dy | 2.00 | Mn | 1.75 | 2.01 | 28 |
|  | 12 | BaTiO$_3$ | 15.00 | 15.00 | 0.0050 | Dy | 2.00 | Mn | 1.75 | 1.75 | 51 |
|  | 13 | BaTiO$_3$ | 0.10 | 0.10 | 0.0050 | Dy | 2.00 | Mn | 1.75 | 1.75 | 70 |

As shown in Table 1, according to any of Examples 1 to 16, there was no defect after 1000 hours (after 1000 h). On the other hand, according to Comparative Examples 1 to 13, there were defects after 1000 hours in the range of five to seventy defects. From this evaluation result, it has been confirmable that the compositions prepared for the ceramic layers according to the present invention as mentioned above make improvements in high-temperature load life. The reasons for improvements in high-temperature load life as just described is believed to be that no segregation phase of Ni—Mg is produced due to the extremely low Mg content (parts by mol) as compared with the related art, and that adverse effects such as abnormal grain growth, which can be caused by the reduced Mg content, are suppressed by the elements (Ca, R, M, and Si) other than Mg.

Further, the numbers of defects in Comparative Examples 12 and 13 are particularly large, which are respectively 51 and 70. This is believed to be because Ca is not included in the core parts of the crystal particles, due to the fact that the starting raw materials contained no CaCO$_3$ in the preparation of the ceramic raw material according to Comparative Examples 12 and 13.

Thus, it is assumed that according to Comparative Examples 12 and 13, solid solubility of the additive constituents is not promoted, thus failing to produce the effect of inhibiting the movement of oxygen vacancies in an insufficient manner, and then decreasing the high-temperature load life.

Table 2 shows the evaluation results and prepared compositions for Experimental Example 2.

TABLE 2

|  |  | Main Constituent | Total Content of Ca (parts by mol) | Content of Subsequently Added Ca (parts by mol) | Mg Content (parts by mol) | Type of R | R1 Content of R (parts by mol) | Type of R | R2 Content of R (parts by mol) | R1 + R2 | R1/ R2 | Type of M | M Content of M (parts by mol) | Content of Si (parts by mol) | The Number of Defects after 1000 h | after 2000 h |
|---|---|---|---|---|---|---|---|---|---|---|---|---|---|---|---|---|
| Example | 17 | (Ba, Ca) TiO$_3$ | 2.00 | 0.00 | 0.0050 | La | 3.00 | — | — | 3.00 | — | Mn | 1.75 | 1.75 | 0 | 0 |
|  | 18 | (Ba, Ca) TiO$_3$ | 2.00 | 0.00 | 0.0050 | Y | 3.00 | Tm | 0.75 | 3.75 | 4.0 | Mn | 1.75 | 1.75 | 0 | 0 |
|  | 19 | (Ba, Ca) TiO$_3$ | 2.00 | 0.00 | 0.0050 | Ho | 0.50 | Ce | 0.10 | 0.60 | 5.0 | Mn | 1.75 | 1.75 | 0 | 0 |
|  | 20 | (Ba, Ca) TiO$_3$ | 2.00 | 0.00 | 0.0050 | Dy | 2.40 | Tb | 0.21 | 2.61 | 11.4 | Mn | 1.75 | 1.75 | 0 | 0 |
|  | 21 | (Ba, Ca) TiO$_3$ | 2.00 | 0.00 | 0.0050 | Sm | 0.80 | Lu | 0.10 | 0.90 | 8.0 | Mn | 1.75 | 1.75 | 0 | 0 |
|  | 22 | (Ba, Ca) TiO$_3$ | 2.00 | 0.00 | 0.0050 | Dy | 2.50 | Eu | 0.10 | 2.60 | 25.0 | Mn | 1.75 | 1.75 | 0 | 0 |
|  | 23 | (Ba, Ca) TiO$_3$ | 2.00 | 0.00 | 0.0050 | Yb | 1.80 | Nd | 0.30 | 2.10 | 6.0 | Mn | 1.75 | 1.75 | 0 | 0 |
|  | 24 | (Ba, Ca) TiO$_3$ | 2.00 | 0.00 | 0.0050 | Ho | 2.00 | Ce | 0.01 | 2.01 | 200.0 | Mn | 1.75 | 1.75 | 0 | 0 |
|  | 25 | (Ba, Ca) TiO$_3$ | 2.00 | 0.00 | 0.0050 | Gd | 3.99 | Pr | 0.01 | 4.00 | 399.0 | Mn | 1.75 | 1.75 | 0 | 0 |
|  | 26 | (Ba, Ca) TiO$_3$ | 2.00 | 0.00 | 0.0050 | — | — | Ce | 2.00 | 2.00 | 0.0 | Mn | 1.75 | 1.75 | 0 | 5 |
|  | 27 | (Ba, Ca) TiO$_3$ | 2.00 | 0.00 | 0.0050 | Er | 3.12 | Tm | 0.80 | 3.92 | 3.9 | Mn | 1.75 | 1.75 | 0 | 5 |

As shown in Table 2, according to Examples 17 to 25, there was no defect either after 1000 hours (after 1000 h) or after 2000 hours. From this evaluation result, it could be confirmed that the high-temperature load life is further improved in the case of containing the two types of rare-earth elements R1 and R2, and having a value of 4.0 or more for R1/R2 in parts by mol. Further, according to any of Examples 26 and 27, there was no defect after 1000 hours (after 1000 h), but there were five defects after 2000 hours. More specifically, the high-temperature load life has not been improved as compared with Examples 1 to 16, because Example 26 fails to contain any element designated as R1, and because Example 27 fails to have a value of 4.0 or more for R1/R2 in parts by mol. However, Examples 26 and 27 also have high-temperature load lives improved as compared with Comparative Examples 1 to 13 and the related art.

It is to be noted that the advantageous effect of the invention is increased as the multilayer ceramic capacitor is reduced in size. It has been confirmed that the advantageous effect is significant, in particular, in a size of 0.6 mm in L-directional dimension×0.3 mm in W-directional dimension×0.3 mm in T-directional dimension.

It is to be noted that the invention is not to be considered limited to the embodiment described above, but various modifications can be made within the scope of the invention.

What is claimed is:

1. A multilayer ceramic capacitor comprising:
a laminated body having a plurality of ceramic layers comprising crystal grains that have a perovskite structure and a plurality of internal electrode layers; and
a pair of external electrodes on a surface of the laminated body, each external electrode of the pair of external electrodes being electrically connected to a respective set of internal electrodes of the plurality of internal electrode layers,
the ceramic layers containing:
a perovskite compound comprising Ba, Ca, and Ti;
Mg;
R, wherein R represents at least one of rare-earth elements La, Ce, Pr, Nd, Sm, Eu, Gd, Tb, Dy, Ho, Er, Tm, Yb, Lu, and Y;
M, wherein M represents at least one of Zr, Mn, Co, Fe, Cr, Cu, Al, V, Mo, and W; and
Si, and
when a Ti content is 100 parts by mol, the ceramic layers containing:
Ca at 0.10 to 15.00 parts by mol;
Mg at 0.0010 to 0.0097 parts by mol;
R at 0.50 to 4.00 parts by mol;
M at 0.10 to 2.00 parts by mol; and
Si at 0.50 to 2.00 parts by mol, and
the crystal grains having core parts containing Ca.

2. The multilayer ceramic capacitor according to claim 1, wherein the R is at least one of rare-earth elements Y, Dy, Gd, La, Ho, Er, Sm, and Yb.

3. The multilayer ceramic capacitor according to claim 1, wherein the R comprises R1 and R2, wherein
the R1 is at least one of rare-earth elements Y, Dy, Gd, La, Ho, Er, Sm, and Yb,
the R2 is at least one of rare-earth elements Ce, Pr, Nd, Eu, Tm, Lu, and Tb, and
the R1/the R2 in parts by mol has a value of 4.0 or more.

4. The multilayer ceramic capacitor according to claim 1, wherein:
Ca is 0.40 to 10.00 parts by mol,
Mg is 0.0010 to 0.0090 parts by mol,
R is 0.50 to 3.00 parts by mol,
M is 0.10 to 1.50 parts by mol, and
Si is 0.60 to 1.90 parts by mol.

5. The multilayer ceramic capacitor according to claim 1, wherein:
Ca is 0.75 to 7.50 parts by mol,
Mg is 0.0010 to 0.0075 parts by mol,
R is 0.50 to 2.50 parts by mol,
M is 0.10 to 1.00 parts by mol, and
Si is 0.80 to 1.60 parts by mol.

6. A multilayer ceramic capacitor comprising:
a laminated body having a plurality of ceramic layers comprising crystal grains that have a perovskite structure and a plurality of internal electrode layers; and
a pair of external electrodes on a surface of the laminated body, each external electrode of the pair of external electrodes being electrically connected to a respective set of internal electrodes of the plurality of internal electrode layers,
the laminated body containing:
a perovskite compound comprising Ba, Ca, and Ti;
Mg;
R, wherein R is at least one of rare-earth elements La, Ce, Pr, Nd, Sm, Eu, Gd, Tb, Dy, Ho, Er, Tm, Yb, Lu, and Y;
M, wherein M is at least one of Zr, Mn, Co, Fe, Cr, Cu, Al, V, Mo, and W; and
Si,
when a Ti content is 100 parts by mol, the laminated body containing:
Ca at 0.10 to 15.00 parts by mol;
Mg at 0.0010 to 0.0097 parts by mol;
R at 0.50 to 4.00 parts by mol;
M at 0.10 to 2.00 parts by mol; and
Si at 0.50 to 2.00 parts by mol, and
the crystal grains having core parts containing Ca.

7. The multilayer ceramic capacitor according to claim 6, wherein the R is at least one of rare-earth elements Y, Dy, Gd, La, Ho, Er, Sm, and Yb.

8. The multilayer ceramic capacitor according to claim 6, wherein the R comprises R1 and R2, wherein
the R1 is at least one of rare-earth elements Y, Dy, Gd, La, Ho, Er, Sm, and Yb,
the R2 is at least one of rare-earth elements Ce, Pr, Nd, Eu, Tm, Lu, and Tb, and
the R1/the R2 in parts by mol has a value of 4.0 or more.

9. The multilayer ceramic capacitor according to claim 6, wherein:
Ca is 0.40 to 10.00 parts by mol,
Mg is 0.0010 to 0.0090 parts by mol,
R is 0.50 to 3.00 parts by mol,
M is 0.10 to 1.50 parts by mol, and
Si is 0.60 to 1.90 parts by mol.

10. The multilayer ceramic capacitor according to claim 6, wherein:
Ca is 0.75 to 7.50 parts by mol,
Mg is 0.0010 to 0.0075 parts by mol,
R is 0.50 to 2.50 parts by mol,
M is 0.10 to 1.00 parts by mol, and
Si is 0.80 to 1.60 parts by mol.

11. A multilayer ceramic capacitor comprising:
a laminated body having a plurality of ceramic layers comprising crystal grains that have a perovskite structure and a plurality of internal electrode layers; and
a pair of external electrodes on a surface of the laminated body, each external electrode of the pair of external electrodes being electrically connected to a respective set of internal electrodes of the plurality of the internal electrode layers, the laminated body containing:
- a perovskite compound comprising Ba, Ca, and Ti;
- Mg;
- R, wherein R represents at least one of rare-earth elements La, Ce, Pr, Nd, Sm, Eu, Gd, Tb, Dy, Ho, Er, Tm, Yb, Lu, and Y;
- M, wherein M represents at least one of Zr, Mn, Co, Fe, Cr, Cu, Al, V, Mo, and W; and
- Si, and when a Ti content is 100 parts by mol when the laminated body is dissolved with a solvent, the laminated body containing:
- Ca at 0.10 to 15.00 parts by mol;
- Mg at 0.0010 to 0.0097 parts by mol;
- R at 0.50 to 4.00 parts by mol;
- M at 0.10 to 2.00 parts by mol; and
- Si at 0.50 to 2.00 parts by mol, and the crystal grains having core parts containing Ca.

12. A method for manufacturing a multilayer ceramic capacitor, the method comprising:
- mixing a powder containing, as a main constituent, a perovskite compound comprising Ba, Ca, and Ti, a Mg compound, a compound of R, a compound of M, and an Si compound to obtain a ceramic slurry, wherein R is at least one of rare-earth elements La, Ce, Pr, Nd, Sm, Eu, Gd, Tb, Dy, Ho, Er, Tm, Yb, Lu, and Y, and M is at least one of Zr, Mn, Co, Fe, Cr, Cu, Al, V, Mo, and W;
- forming the ceramic slurry into ceramic green sheets;
- forming a raw laminated body by laminating the ceramic green sheets and internal electrode patterns; and
- firing the raw laminated body to obtain a laminated body with internal electrode layers, wherein when a Ti content in the ceramic slurry is 100 parts by mol, the ceramic slurry contains:
- Ca at 0.10 to 15.00 parts by mol;
- Mg at 0.0010 to 0.0097 parts by mol;
- R at 0.50 to 4.00 parts by mol;
- M at 0.10 to 2.00 parts by mol; and
- Si at 0.50 to 2.00 parts by mol.

13. The method for manufacturing a multilayer ceramic capacitor according to claim 12, further comprising mixing a Ca compound with the powder containing the perovskite compound.

14. The method for manufacturing a multilayer ceramic capacitor according to claim 12, wherein the R is at least one of rare-earth elements Y, Dy, Gd, La, Ho, Er, Sm, and Yb.

15. The method for manufacturing a multilayer ceramic capacitor according to claim 12, wherein the R comprises R1 and R2,
- R1 is at least one of rare-earth elements Y, Dy, Gd, La, Ho, Er, Sm, and Yb,
- R2 is at least one of rare-earth elements Ce, Pr, Nd, Eu, Tm, Lu, and Tb, and
- the R1/the R2 in parts by mol has a value of 4.0 or more.

16. The method for manufacturing a multilayer ceramic capacitor according to claim 12, wherein:
- Ca is 0.40 to 10.00 parts by mol,
- Mg is 0.0010 to 0.0090 parts by mol,
- R is 0.50 to 3.00 parts by mol,
- M is 0.10 to 1.50 parts by mol, and
- Si is 0.60 to 1.90 parts by mol.

17. The method for manufacturing a multilayer ceramic capacitor according to claim 12, wherein:
- Ca is 0.75 to 7.50 parts by mol,
- Mg is 0.0010 to 0.0075 parts by mol,
- R is 0.50 to 2.50 parts by mol,
- M is 0.10 to 1.00 parts by mol, and
- Si is 0.80 to 1.60 parts by mol.

* * * * *